NELSON BURR.

Improvement in Grinding Mills.

No. 4,739. Reissued Feb. 6, 1872.

Witnesses.

J. S. Dennis

R. D. O. Smith

Inventor.

Nelson Burr by Lewis L. Lyburn

Atty

UNITED STATES PATENT OFFICE.

NELSON BURR, OF BATAVIA, ILLINOIS.

IMPROVEMENT IN GRINDING-MILLS.

Specification forming part of Letters Patent No. 94,072, dated August 24, 1869; reissue No. 4,739, dated February 6, 1872.

DIVISION A.

SPECIFICATION (A.)

*To all whom it may concern:*

Be it known that I, NELSON BURR, of Batavia, in the county of Kane and State of Illinois, have invented certain new and useful Improvements in Mills; and I do hereby declare that the following is a full, clear, and exact description thereof, reference being had to the accompanying drawing and to the letters of reference marked thereon which form a part of this specification, in which—

Figure 1:
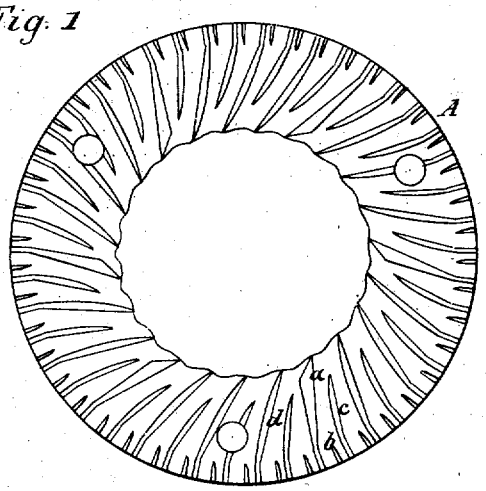
Figure 3:
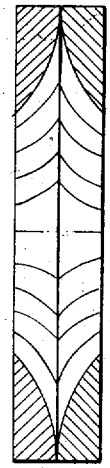
Figure 2:
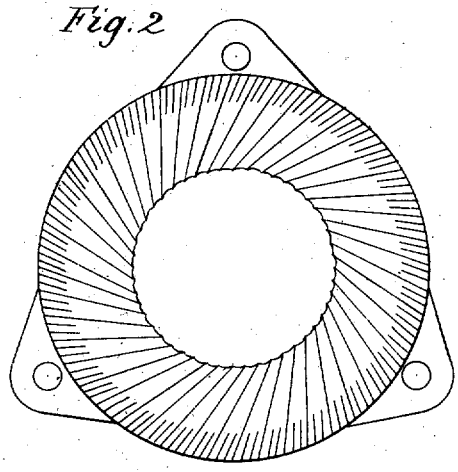

Figure 1 represents the grinding-surface of the ring or disk. Fig. 2 designates the same form of grinding-surface with Fig. 1, but on a reduced scale. Fig. 3 is a central vertical section of the ring or disk.

The nature of my invention consists in the peculiar construction and dressing of cast-iron rings, so as to adapt them for grinding corn or other grain, as set forth.

After long experience and observation I have discovered, and I claim to have established, a principle contrary to that generally received, and to have proved satisfactorily that the mode to increase the capacity of a mill for grinding is not to increase the grinding-surface, but to diminish it, as is exhibited by the rings or disks here shown. As the grinding process is carried on near the center of motion there is a great gain of power, and an increased rapidity of motion obtained. As a necessary consequence of rapid motion the centrifugal force will be so great as to expel the meal instantly from between the disks, and thus prevent its heating or clogging. The grinding-surface I place at the extreme outer edge of the disks or rings, and have found that a great advantage is gained in making it very narrow. I make this grinding-surface less than one inch—say, one-fourth of an inch, more or less—in width, as I find that in ordinary mills where the grinding-surface is broad the grain is carried round and cannot escape fast enough to prevent heating. I also find by experiment that the grain is ground before the heating takes place. In my invention the meal escapes so soon as it is ground, and before it has time to heat. A mill made after my invention with the narrow grinding-surface will effectually grind from three to six times the amount of grain, in a given time, as an ordinary mill with the usual broader grinding-surface and an equivalent power.

A represents a cast-iron disk or ring, an inch, more or less, in width on its face, and curved downward from near the outer to the inner circumference. *a b c d* are the ridges or teeth of the grinding-surface, made in the usual manner, except that the actual level grinding-surface at which the two disks are directly opposed to each other is represented by the narrow border extending only the length inward of the short ridges *b*, which I make a quarter of an inch, more or less, in length in a disk of five-and-a-half inches diameter, more or less. The outer ridges *a c d* proceed from the outer circumference to the extent of the ridges *b* in the same manner as said ridges *b*, and are prolonged thereafter toward the center in the usual shapes and proportions, to serve as a drift or feeding arrangement to feed the grain to the grinding-surface.

Having thus described my invention, what I claim, and desire to secure by Letters Patent, is—

The combination, in a portable grinding-mill, of two annular detachable grinding-rings, provided with narrow grinding-surfaces not exceeding one-fourth of an inch in width, from which the grain is discharged as soon as it is ground, as specified.

Witnesses: NELSON BURR.

GEO. G. LYON,

WM. D. NICHOLS.